Patented Nov. 24, 1953

2,660,576

UNITED STATES PATENT OFFICE 2,660,576

MONOAZODYESTUFF

Werner Schleifenbaum, Leverkusen-Bayerwerk, Germany, assignor to Farbenfabriken Bayer, Leverkusen, Germany No Drawing. Application August 21, 1951, Serial No. 242,997

Claims priority, application Germany August 23, 1950

1 Claim. (Cl. 260—203)

The present invention relates to a new water-insoluble monoazodyestuff and to a process of making the same.

The new monoazodyestuff corresponds to the following formula:

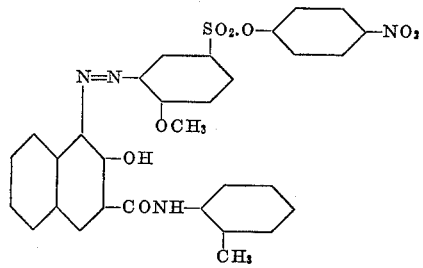

This dyestuff which is bluish red, shows remarkable fastness properties and can be used as pigment dyestuff. It is obtained by coupling the diazotized 4-nitrophenyl ester of 1-amino-2-methoxybenzene-5-sulfonic acid with 1-(2',3'-hydroxynaphthoylamino) - 2 - methylbenzene. Preferably the manufacture of the dyestuff is carried out as follows: First the 1-(2',3'-hydroxynaphthoylamino)-2-methylbenzene is reduced to a fine easily coupling form which is then combined with the diazo-solution of the 4-nitrophenyl ester of 1-amino-2-methoxybenzene-5-sulfonic acid. The diazo-solution is obtained by diazotizing the suspension of the chlorhydrate of the base in dilute hydrochloric acid or by carrying out the diazotization in acetic solution. The coupling is carried out at Congo-acid reaction. To accelerate coupling the mineral acid may be partly or completely neutralized by the addition of salts of organic acids, particularly sodium acetate. It has been found to be of advantage to use surface-active compounds in the manufacture of the dyestuff. The coupling may also be carried out in the presence of a suitable substratum; in this case e. g. an aqueous slurry of freshly precipitated barium sulfate is added to the solution or the suspension of the arylamide.

The new dyestuff is in the dry state a red powder which is practically insoluble in oil, alcohol, benzene, and the solvents ordinarily used for lacquers. The dyestuff is extraordinarily clear and very fast to light.

On account of its vivid and pure shade and its excellent fastness properties the new monoazodyestuff is especially suited to be applied in graphic printing, for the staining of wall paper, coloring of oil lacquers, of nitrocellulose lacquers, of lacquers on the basis of artificial resins, of which a good fastness to lacquer solvents (overstriping) is required, as well as for the coloring of plastics.

The following examples illustrate the present invention, without being restricted thereto:

Example 1

290 grams of 1-(2',3'-hydroxynaphthoylamino)-2-methyl-benzene are dissolved in 2100 cc. of water and 210 grams of 45 per cent sodium hydroxide solution with slight heating. This solution may be filtered, if desired, and a solution of 11 grams of a sodium alkyl ($C_{16}$—$C_{18}$) sulfonate in 200 cc. of water is added. By adding ice the solution is cooled to 2–3° C. and the arylamide is re-precipitated by running into it a 30 per cent hydrochloric acid until mineral-acid reaction is reached. Instead of a sodium alkyl sulfonate also other surface-active substances may be used, e. g. the condensation product of oleyl chloride and sodium methylamino ethane sulfonate or sarcosine.

Besides 360.5 grams of the chlorhydrate of the 4-nitrophenyl ester of 1-amino-2-methoxybenzene-5-sulfonic acid are stirred with a mixture of 1385 cc. of water and 350 cc. of 30 per cent hydrochloric acid. Within half an hour a solution of 73 grams of sodium nitrite in 250 cc. of water is run into the suspension at 15° C. with stirring. Diazotization is complete after one hour. The diazo-solution is added to the arylamide suspension and the mixture is slowly heated to 40° C. Coupling is normally completed after 4–5 hours. The dyestuff is sucked off and washed acid-free. In the dry state the dyestuff is a bright red powder.

Example 2

324 grams of the 4-nitrophenyl ester of 1-amino-2-methoxybenzene-5-sulfonic acid are dissolved in a mixture of 750 cc. of glacial acetic acid, 750 cc. of water, and 390 cc. of 30 per cent hydrochloric acid by briefly heating. By external cooling the solution is cooled to about 10° C. and a solution of 73 grams of sodium nitrite in 250 cc. of water is slowly introduced. This diazo-solution is added to the arylamide suspension prepared according to Example 1 and a 30 per cent sodium acetate solution is run into the mixture at a rate that the liquid always shows a weakly Congo-acid reaction, simultaneously heating to 40° C. After 4 hours dyestuff formation is finished.

I claim:
As a new compound the water insoluble monoazodyestuff of the formula:
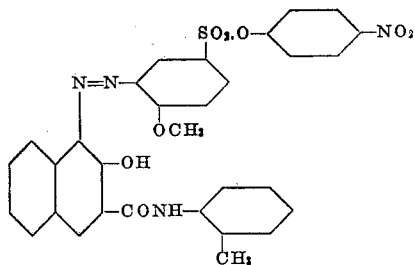
WERNER SCHLEIFENBAUM.
References Cited in the file of this patent
UNITED STATES PATENTS
| Number | Name | Date |
| --- | --- | --- |
| 2,066,985 | Lamberz et al. | Jan. 5, 1937 |
| 2,134,642 | Petitcolas et al. | Oct. 25, 1938 |
| 2,199,814 | Broker | May 7, 1940 |